US011332867B2

(12) United States Patent
Davis

(10) Patent No.: US 11,332,867 B2
(45) Date of Patent: May 17, 2022

(54) WASHING MACHINE APPLIANCES AND METHODS OF USING DETECTED MOTION TO LIMIT BEARING FORCES

(71) Applicant: Haier US Appliance Solutions, Inc., Wilmington, DE (US)

(72) Inventor: Paul Owen Davis, Prospect, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 333 days.

(21) Appl. No.: 16/267,860

(22) Filed: Feb. 5, 2019

(65) Prior Publication Data
US 2020/0248350 A1 Aug. 6, 2020

(51) Int. Cl.
*D06F 33/00* (2020.01)
*D06F 37/30* (2020.01)
*D06F 37/20* (2006.01)
*D06F 23/02* (2006.01)
*D06F 37/26* (2006.01)
*F16C 41/00* (2006.01)
(Continued)

(52) U.S. Cl.
CPC ............ *D06F 33/00* (2013.01); *D06F 23/025* (2013.01); *D06F 33/48* (2020.02); *D06F 37/267* (2013.01); *D06F 37/304* (2013.01); *F16C 41/00* (2013.01); *G01P 15/14* (2013.01); *D06F 34/16* (2020.02); *D06F 2103/26* (2020.02); *D06F 2105/48* (2020.02); *F16C 19/527* (2013.01); *F16C 2233/00* (2013.01)

(58) Field of Classification Search
CPC ........ G01P 15/14; F16C 19/527; F16C 41/00; F16C 2233/00; F16C 2326/05; D06F 37/203; D06F 37/304; D06F 33/00; D06F 33/48; D06F 23/025; D06F 37/267; D06F 2103/26; D06F 2222/00; D06F 2204/065; D06F 2202/12; D06F 34/16
See application file for complete search history.

(56) References Cited

U.S. PATENT DOCUMENTS 6,783,675 B1   8/2004  Sans Rovira et al.
7,581,272 B2   9/2009  Xie et al.
(Continued)

FOREIGN PATENT DOCUMENTS

CN    105442244 A    3/2016
EP      2666899 A1   11/2013
GB      2361715 B    10/2001

*Primary Examiner* — Benjamin L Osterhout
(74) *Attorney, Agent, or Firm* — Dority & Manning, P.A.

(57) ABSTRACT

A washing machine appliance includes a wash basket rotatably mounted within a wash tub and supported by a front bearing and a rear bearing. A method of operating the washing machine appliance includes rotating the wash basket within the wash tub at a basket speed and obtaining first and second displacement amplitudes of the wash tub. Bearing forces at the front and rear bearings are obtained based on the basket speed and the displacement amplitudes. The determined bearing force at the front bearing is compared to a front limit. The determined bearing force at the rear bearing is compared to a rear limit. If the determined bearing force value at either of the front bearing or the rear bearing is greater than or equal to the respective limit, an operating parameter of the washing machine appliance is adjusted to limit bearing forces resulting from out-of-balance loads.

16 Claims, 6 Drawing Sheets

(51) Int. Cl.
*G01P 15/14* (2013.01)
*D06F 33/48* (2020.01)
*D06F 105/48* (2020.01)
*F16C 19/52* (2006.01)
*D06F 103/26* (2020.01)
*D06F 34/16* (2020.01)

(56) References Cited

U.S. PATENT DOCUMENTS

| | | |
|---|---|---|
| 8,341,787 B2 | 1/2013 | Kim et al. |
| 8,930,031 B2 | 1/2015 | Wong et al. |
| 2005/0283918 A1* | 12/2005 | Zhang .................. D06F 37/203 8/158 |
| 2005/0288885 A1* | 12/2005 | Zhang .................. G01R 35/00 702/107 |
| 2006/0185097 A1* | 8/2006 | Weinmann ............ D06F 37/203 8/159 |
| 2006/0242768 A1* | 11/2006 | Zhang .................. D06F 34/16 8/159 |
| 2007/0266504 A1* | 11/2007 | Xie ....................... D06F 37/203 8/158 |
| 2014/0115793 A1 | 5/2014 | Hamin et al. |

\* cited by examiner

WASHING MACHINE APPLIANCES AND METHODS OF USING DETECTED MOTION TO LIMIT BEARING FORCES

FIELD OF THE INVENTION

The present subject matter relates generally to washing machine appliances, such as horizontal axis washing machine appliances, and methods for monitoring load balances and limiting the basket speed in such washing machine appliances.

BACKGROUND OF THE INVENTION

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A basket is rotatably mounted within the wash tub and defines a wash chamber for receipt of articles for washing. During normal operation of such washing machine appliances, the wash fluid is directed into the wash tub and onto articles within the wash chamber of the basket. A drive assembly is coupled to the wash tub and configured to rotate the wash basket within the wash tub to agitate articles within the wash chamber, to wring wash fluid from articles within the wash chamber, etc.

A significant concern during operation of washing machine appliances is the balance of the tub during operation. For example, articles and water loaded within a basket may not be equally weighted about a central axis of the basket and tub. Accordingly, when the basket rotates, e.g., during a spin cycle, the imbalance in clothing weight may cause the basket to be out-of-balance within the tub, such that the axis of rotation does not align with the cylindrical axis of the basket or tub. Such out-of-balance issues can cause the basket to contact the tub during rotation and can further cause movement of the tub within the cabinet. Significant movement of the tub can, in turn, generate increased noise and vibrations and/or cause excessive wear and premature failure of appliance components.

Various methods are known for monitoring load balances and preventing out-of-balance scenarios within washing machine appliances. Such monitoring and prevention may be especially important, for instance, during the high-speed rotation of the wash basket, e.g., during a spin cycle. For example, conventional systems monitor motor current or rotational velocity to determine when articles within the tub are in a suitable position for a spin cycle. Alternatively, one or more balancing rings may be attached to the rotating basket to provide a rotating annular mass that minimizes the effects of imbalances. However, such systems often fail to accurately determine the position of articles within the tub or basket or detect an out-of-balance condition. Moreover, such systems often require additional components and/or sensors, thereby increasing the cost and complexity of the appliance.

Accordingly, improved methods and apparatuses for monitoring load balance in washing machine appliances are desired. In particular, methods and apparatuses that provide for accurate detection of a balanced state or compensation for an imbalanced state during a washing operation would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a washing machine appliance is provided. The washing machine appliance has a wash tub, a wash basket rotatably mounted within the wash tub by a drive shaft, and a front bearing and a rear bearing supporting the drive shaft. The method includes rotating the wash basket within the wash tub at a basket speed, obtaining a first displacement amplitude of the wash tub, and obtaining a second displacement amplitude of the wash tub. The method further includes determining a bearing force at the front bearing based on the basket speed, the first displacement amplitude, and the second displacement amplitude and determining a bearing force at the rear bearing based on the basket speed, the first displacement amplitude, and the second displacement amplitude. The method also includes comparing the bearing force at the front bearing to a front limit and comparing the bearing force at the rear bearing to a rear limit. When the bearing force at the front bearing is greater than or equal to the front limit or the bearing force at the rear bearing is greater than or equal to the rear limit, the method includes adjusting at least one operating parameter of the washing machine appliance.

In another exemplary aspect of the present disclosure, a washing machine appliance is provided. The washing machine appliance includes a cabinet, a wash tub positioned within the cabinet, a measurement device operably coupled to the wash tub, and a wash basket rotatably mounted within the wash tub by a drive shaft supported by a front bearing and a rear bearing. A drive assembly is in mechanical communication with the wash basket for rotating the wash basket. The washing machine appliance also includes a controller communicatively coupled to the drive assembly and the measurement device. The controller is configured for rotating the wash basket within the wash tub at a basket speed, obtaining a first displacement amplitude of the wash tub, and obtaining a second displacement amplitude of the wash tub. The controller is further configured for determining a bearing force at the front bearing based on the basket speed, the first displacement amplitude, and the second displacement amplitude and determining a bearing force at the rear bearing based on the basket speed, the first displacement amplitude, and the second displacement amplitude. The controller is also configured for comparing the bearing force at the front bearing to a front limit and comparing the bearing force at the rear bearing to a rear limit. When the bearing force at the front bearing is greater than or equal to the front limit or the bearing force at the rear bearing is greater than or equal to the rear limit, the controller is configured for adjusting at least one operating parameter of the washing machine appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
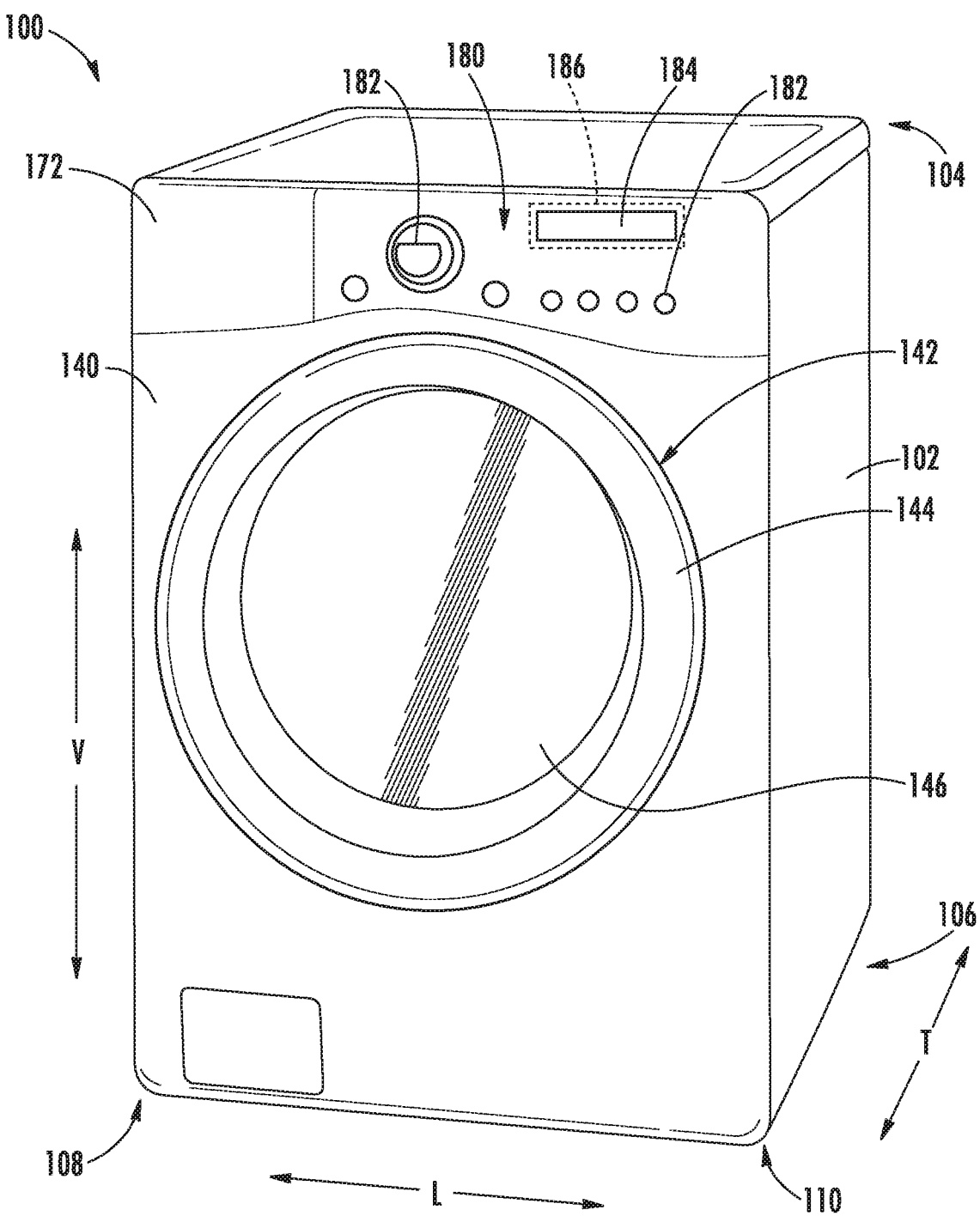
FIG. 1 provides a perspective view of a washing machine appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one element from another and are not intended to signify location or importance of the individual elements. Furthermore, it should be appreciated that as used herein, terms of approximation, such as "approximately," "substantially," or "about," refer to being within a ten percent margin of error.

Figure 2:
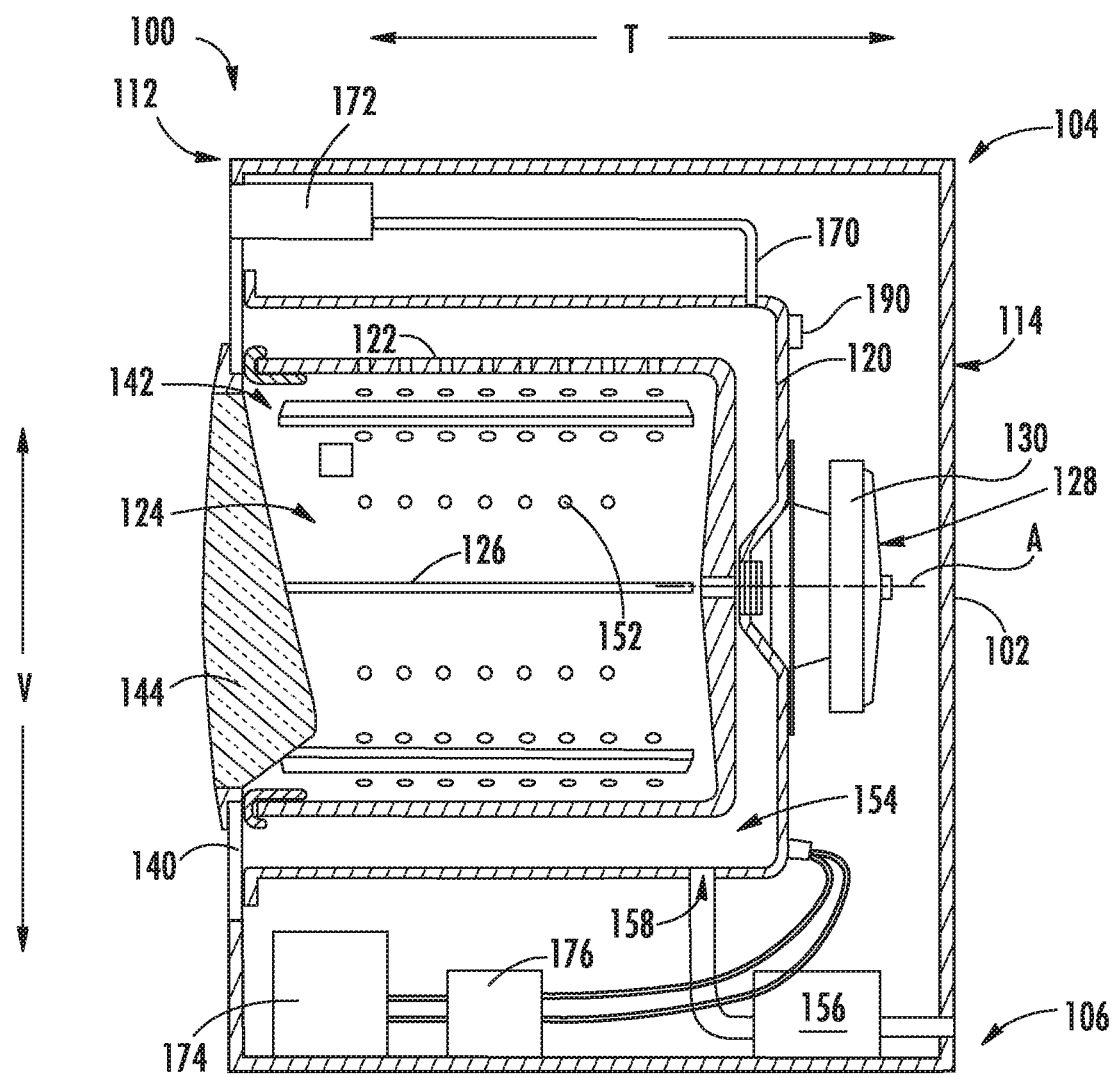
FIG. 2 provides a cross-sectional side view of the exemplary washing machine appliance.

Referring now to the figures, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash tub 120 is positioned within cabinet 102 and is generally configured for retaining wash fluids during an operating cycle. As used herein, "wash fluid" may refer to water, detergent, fabric softener, bleach, or any other suitable wash additive or combination thereof. A wash basket 122 is received within wash tub 120 and defines a wash chamber 124 that is configured for receipt of articles for washing. More specifically, wash basket 122 is rotatably mounted within wash tub 120 such that it is rotatable about an axis of rotation A. According to the illustrated embodiment, the axis of rotation is substantially parallel to the transverse direction T. In this regard, washing machine appliance 100 is generally referred to as a "horizontal axis" or "front load" washing machine appliance 100. However, it should be appreciated that aspects of the present subject matter may be used within the context of a vertical axis or top load washing machine appliance as well.

Wash basket 122 may define one or more agitator features that extend into wash chamber 124 to assist in agitation and cleaning articles disposed within wash chamber 124 during operation of washing machine appliance 100. For example, as illustrated in FIG. 2, a plurality of ribs 126 extends from basket 122 into wash chamber 124. In this manner, for example, ribs 126 may lift articles disposed in wash basket 122 during rotation of wash basket 122.

Figure 4:
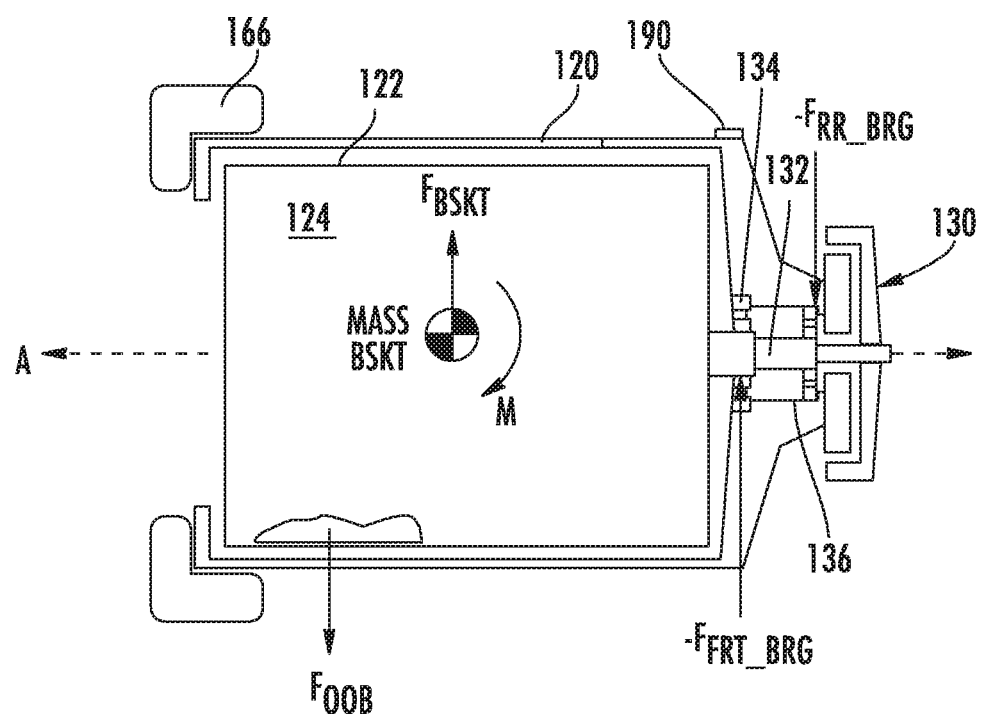
FIG. 4 provides a schematic side view of components of a washing machine appliance in accordance with exemplary embodiments of the present disclosure.

Washing machine appliance 100 includes a drive assembly 128 which is coupled to wash tub 120 and is generally configured for rotating wash basket 122 during operation, e.g., such as during an agitation or spin cycle. More specifically, as best illustrated in FIGS. 2 and 4, drive assembly 128 may include a motor assembly 130 that is in mechanical communication with wash basket 122 via a drive shaft 132 to selectively rotate wash basket 122 (e.g., during an agitation or a rinse cycle of washing machine appliance 100). In addition, drive shaft 132 is principally rotatably supported by a front bearing 134 and a rear bearing 136. According to the illustrated embodiment, motor assembly 130 is a pancake motor. However, it should be appreciated that any suitable type, size, or configuration of motors may be used to rotate wash basket 122 according to alternative embodiments. In addition, drive assembly 128 may include any other suitable number, types, and configurations of support bearings or drive mechanisms.

Referring generally to FIGS. 1 and 2, cabinet 102 also includes a front panel 140 that defines an opening 142 that permits user access to wash basket 122 of wash tub 120. More specifically, washing machine appliance 100 includes a door 144 that is positioned over opening 142 and is rotatably mounted to front panel 140 (e.g., about a door axis that is substantially parallel to the vertical direction V). In this manner, door 144 permits selective access to opening 142 by being movable between an open position (not shown) facilitating access to a wash tub 120 and a closed position (FIG. 1) prohibiting access to wash tub 120.

In some embodiments, a window 146 in door 144 permits viewing of wash basket 122 when door 144 is in the closed position (e.g., during operation of washing machine appliance 100). Door 144 also includes a handle (not shown) that, for example, a user may pull when opening and closing door 144. Further, although door 144 is illustrated as mounted to front panel 140, it should be appreciated that door 144 may be mounted to another side of cabinet 102 or any other suitable support according to alternative embodiments. Additionally or alternatively, a front gasket or baffle (not shown) may extend between tub 120 and the front panel 140 about the opening 142 covered by door 144, further sealing tub 120 from cabinet 102.

Referring again to FIG. 2, wash basket 122 also defines a plurality of perforations 152 in order to facilitate fluid communication between an interior of basket 122 and wash tub 120. A sump 154 is defined by wash tub 120 at a bottom of wash tub 120 along the vertical direction V. Thus, sump 154 is configured for receipt of, and generally collects, wash fluid during operation of washing machine appliance 100. For example, during operation of washing machine appliance 100, wash fluid may be urged (e.g., by gravity) from basket 122 to sump 154 through plurality of perforations 152. A pump assembly 156 is located beneath wash tub 120 for gravity assisted flow when draining wash tub 120 (e.g., via a drain 158). Pump assembly 156 is also configured for recirculating wash fluid within wash tub 120.

Figure 3:
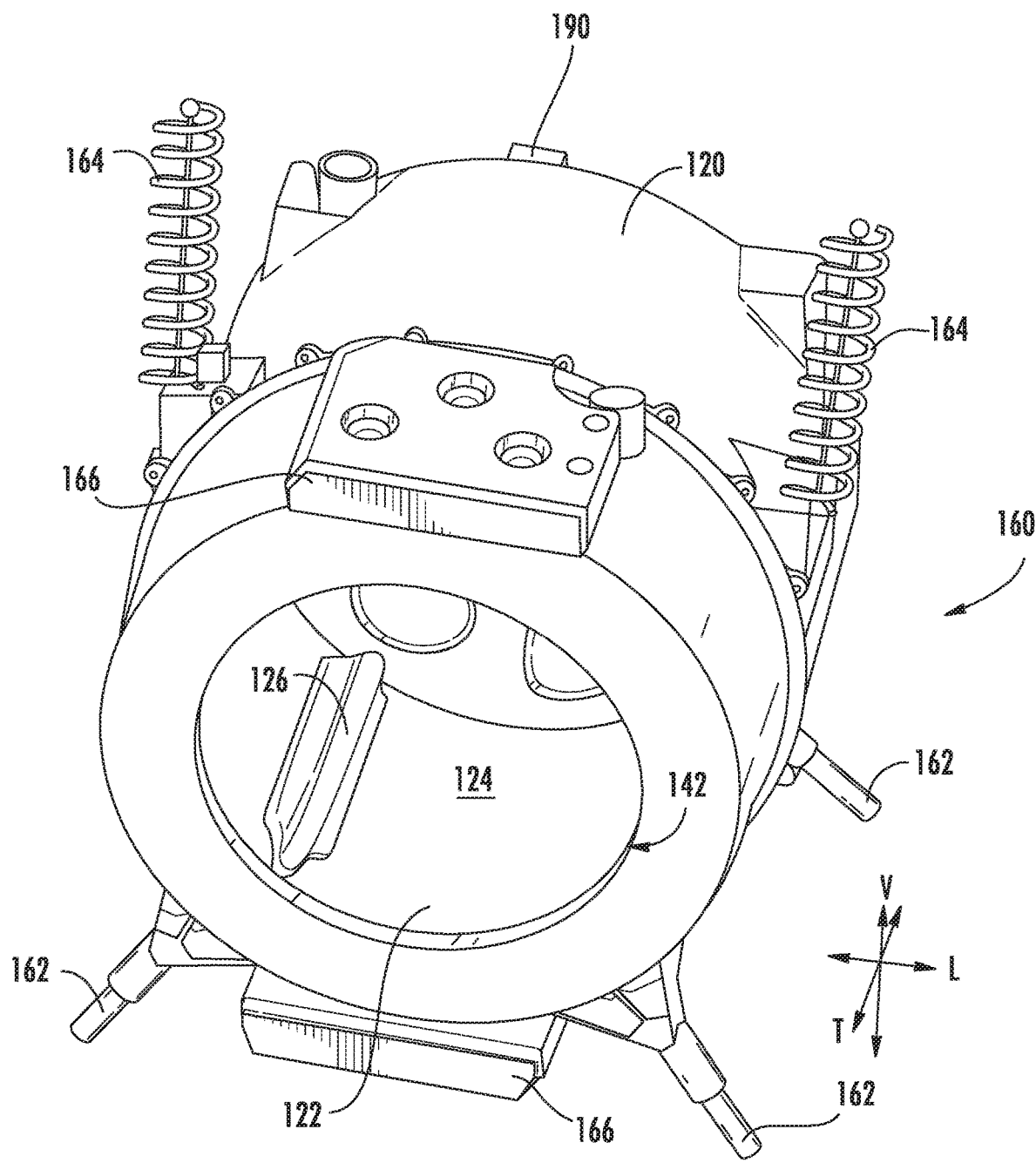
FIG. 3 provides a perspective view of a portion of the exemplary washing machine appliance, wherein the cabinet has been removed for clarity.

Turning briefly to FIG. 3, basket 122 and tub 120 are supported within cabinet 102 by a vibration damping system or suspension system 160. Suspension system 160 generally operates to damp or reduce dynamic motion and absorb vibrations resulting from the movement of wash basket 122 within the tub 120. Suspension system 160 can include one or more damper assemblies 162 coupled between and to the cabinet 102 and wash tub 120 (e.g., at a bottom portion or bottom 106 of wash tub 120). Typically, four damper assemblies 162 are utilized, and are spaced apart about the wash tub 120. For example, each damper assembly 162 may be connected at one end proximate to a bottom corner of the cabinet 102.

Additionally or alternatively, washing machine appliance 100 can include other vibration damping elements, such as one or more suspension springs 164. According to the illustrated embodiment, suspension system 160 includes two suspension springs 164 that extend between top 104 of cabinet 102 and sides of wash tub 120, e.g., to be fixed at a location proximate to but above a center of gravity of wash tub 120. In optional embodiments, suspension system 160 (and washing machine appliance 100, generally) is free of any annular balancing rings, which would add an evenly-distributed rotating mass on basket 122.

Still referring to FIG. 3, according to an exemplary embodiment, washing machine appliance 100 may further include one or more counterweights 166. For example, according to the illustrated embodiment, counterweights 166 are mounted to a front of the wash tub 120, both at the top and the bottom. However, according to alternative embodiments, any suitable number, size, and position of counterweights may be used. In general, counterweights 166 are configured for offsetting the weight of motor assembly 130, thereby moving the center of gravity of wash tub 120 closer to its longitudinal center. In this manner, the consistent alignment of the wash tub 120 to the center of the cabinet 102 is improved.

Returning to FIGS. 1 and 2, in some embodiments, washing machine appliance 100 includes an additive dispenser or spout 170. For example, spout 170 may be in fluid communication with a water supply (not shown) in order to direct fluid (e.g., clean water) into wash tub 120. Spout 170 may also be in fluid communication with the sump 154. For example, pump assembly 156 may direct wash fluid disposed in sump 154 to spout 170 in order to circulate wash fluid in wash tub 120.

As illustrated, a detergent drawer 172 may be slidably mounted within front panel 140. Detergent drawer 172 receives a wash additive (e.g., detergent, fabric softener, bleach, or any other suitable liquid or powder) and directs the fluid additive to wash chamber 124 during operation of washing machine appliance 100. According to the illustrated embodiment, detergent drawer 172 may also be fluidly coupled to spout 170 to facilitate the complete and accurate dispensing of wash additive.

In optional embodiments, a bulk reservoir 174 is disposed within cabinet 102. Bulk reservoir 174 may be configured for receipt of fluid additive for use during operation of washing machine appliance 100. Moreover, bulk reservoir 174 may be sized such that a volume of fluid additive sufficient for a plurality or multitude of wash cycles of washing machine appliance 100 (e.g., five, ten, twenty, fifty, or any other suitable number of wash cycles) may fill bulk reservoir 174. Thus, for example, a user can fill bulk reservoir 174 with fluid additive and operate washing machine appliance 100 for a plurality of wash cycles without refilling bulk reservoir 174 with fluid additive. A reservoir pump 176 is configured for selective delivery of the fluid additive from bulk reservoir 174 to wash tub 120.

A control panel 180 including a plurality of input selectors 182 is coupled to front panel 140. Control panel 180 and input selectors 182 collectively form a user interface input for operator selection of machine cycles and features. A display 184 of control panel 180 indicates selected features, operation mode, a countdown timer, and/or other items of interest to appliance users regarding operation.

Operation of washing machine appliance 100 is controlled by a processing device or a controller 186 that is operatively coupled to control panel 180 for user manipulation to select washing machine cycles and features. In response to user manipulation of control panel 180, controller 186 operates the various components of washing machine appliance 100 to execute selected machine cycles and features. Controller 186 may include a memory and microprocessor, such as a general or special purpose microprocessor operable to execute programming instructions or micro-control code associated with methods described herein. Alternatively, controller 186 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 180 and other components of washing machine appliance 100 may be in communication with controller 186 via one or more signal lines or shared communication busses.

In exemplary embodiments, during operation of washing machine appliance 100, laundry items are loaded into wash basket 122 through opening 142, and a wash operation is initiated through operator manipulation of input selectors 182. For example, a wash cycle may be initiated such that wash tub 120 is filled with water, detergent, or other fluid additives (e.g., via detergent drawer 172 or bulk reservoir 174). One or more valves (not shown) can be controlled by washing machine appliance 100 to provide for filling wash basket 122 to the appropriate level for the amount of articles being washed or rinsed. By way of example, once wash basket 122 is properly filled with fluid, the contents of wash basket 122 can be agitated (e.g., with ribs 126) for an agitation phase of laundry items in wash basket 122. During the agitation phase, the basket 122 may be motivated about the axis of rotation A at a set speed (e.g., first speed or tumble speed). As the basket 122 is rotated, articles within the basket 122 may be lifted and permitted to drop therein.

After the agitation phase of the washing operation is completed, wash tub 120 can be drained, e.g., by drain pump assembly 156. Laundry articles can then be rinsed (e.g., through a rinse cycle) by again adding fluid to wash tub 120, depending on the particulars of the cleaning cycle selected by a user. Ribs 126 may again provide agitation within wash basket 122. One or more spin cycles may also be used. In particular, a spin cycle may be applied after the wash cycle or after the rinse cycle in order to wring wash fluid from the articles being washed. During a spin cycle, basket 122 is rotated at relatively high speeds. For instance, basket 122 may be rotated at one set speed (e.g., second speed or pre-plaster speed) before being rotated at another set speed (e.g., third speed or plaster speed). As would be understood, the pre-plaster speed may be greater than the tumble speed and the plaster speed may be greater than the pre-plaster speed. Moreover, agitation or tumbling of articles may be reduced as basket 122 increases its rotational velocity such that the plaster speed maintains the articles at a generally fixed position relative to basket 122. After articles disposed in wash basket 122 are cleaned (or the washing operation otherwise ends), a user can remove the articles from wash basket 122 (e.g., by opening door 144 and reaching into wash basket 122 through opening 142).

Referring now to FIGS. 3 through 6, one or more measurement devices 190 may be provided in the washing machine appliance 100 for measuring movement of the tub 120, e.g., during rotation of articles in the spin cycle of the washing operation. Measurement devices 190 may measure a variety of suitable variables that can be correlated to movement of the tub 120. The movement measured by such devices 190 can be utilized to, e.g., monitor the load balance state of the tub 120, determine the displacement amplitudes of wash tub 120 at various locations, and to adjust operation of washing machine appliance to prevent excessive wear or damage to bearings 134, 136 or other components of washing machine appliance 100.

A measurement device 190 in accordance with the present disclosure may include an accelerometer which measures translational motion, such as acceleration along one or more directions. Additionally or alternatively, a measurement device 190 may include a gyroscope, which measures rotational motion, such as rotational velocity about an axis. Moreover, according to exemplary embodiments, a measurement device 190 may include more than one gyroscope and/or more than one accelerometer.

Control panel 180 and other components of washing machine appliance 100, such as motor assembly 130 and measurement device 190, may be in communication with controller 186 via one or more signal lines or shared communication busses. Optionally, measurement device 190 may be included with controller 186 or may alternatively be a printed circuit board that includes the gyroscope and accelerometer thereon. According to exemplary embodiments, measurement devices 190 may include a dedicated microprocessor that performs the calculations specific to the measurement of motion with the calculation results being used by controller 186.

According to the illustrated embodiment, measurement device 190 is mounted to the tub 120 to sense movement of the tub 120 relative to the cabinet 102, e.g., by measuring uniform periodic motion, non-uniform periodic motion, or excursions of the tub 120 during appliance 100 operation. For instance, movement may be measured as discrete identifiable components (e.g., in a predetermined direction). More specifically, according to the illustrated embodiment, measurement device 190 is mounted at a rear of wash tub 120, e.g., to facilitate simple wiring, improved assembly and rigidity, and reduced likelihood of damage. As explained herein, positioning measurement device 190 on wash tub 120 may permit controller 186 to determine the movement of any other position on wash tub 120. However, it should be appreciated that according to alternative embodiments, any suitable number, type, and position of measurement devices may be used.

The measurement device 190 may be mounted to the tub 120 (e.g., via a suitable mechanical fastener, adhesive, etc.) and may be oriented such that the various sub-components (e.g., the gyroscope and accelerometer) are oriented to measure movement along or about particular directions as discussed herein. Notably, the gyroscope and accelerometer in exemplary embodiments are advantageously mounted to the tub 120 at a single location (e.g., the location of the printed circuit board or other component of the measurement device 190 on which the gyroscope and accelerometer are grouped). Such positioning at a single location advantageously reduces the costs and complexity (e.g., due to additional wiring, etc.) of bearing force determination, which may be useful, e.g., for out-of-balance detection, while still providing relatively accurate bearing force determination. Alternatively, however, the gyroscope and accelerometer need not be mounted at a single location. For example, a gyroscope located at one location on tub 120 can measure the rotation of an accelerometer located at a different location on tub 120, because rotation about a given axis is approximately the same everywhere on a rigid object such as tub 120.

An exemplary method of using measurement device 190 to set limit thresholds on the motion caused by an unbalanced wash load will now be described in detail. Specifically, the exemplary embodiment describes a method for determining two limit thresholds without consideration of the size or location of the unbalanced mass. Instead of determining the size of the unbalanced mass (as done in many prior control algorithms), the present method uses a maximum force to be allowed at each of the bearings supporting the drive shaft which supports and rotates the wash basket. More specifically, continuing the example from above, measurement device 190 is used to monitor the motion of wash tub 120 and for determining the forces such motion generates at both front bearing 134 and rear bearing 136. In the event the motion generates a force that exceeds a predetermined threshold for either of these bearings 134, 136, washing machine appliance 100, or more specifically controller 186, takes corrective action to reduce or eliminate stress on the bearings 134, 136 or other appliance components.

Figure 5:
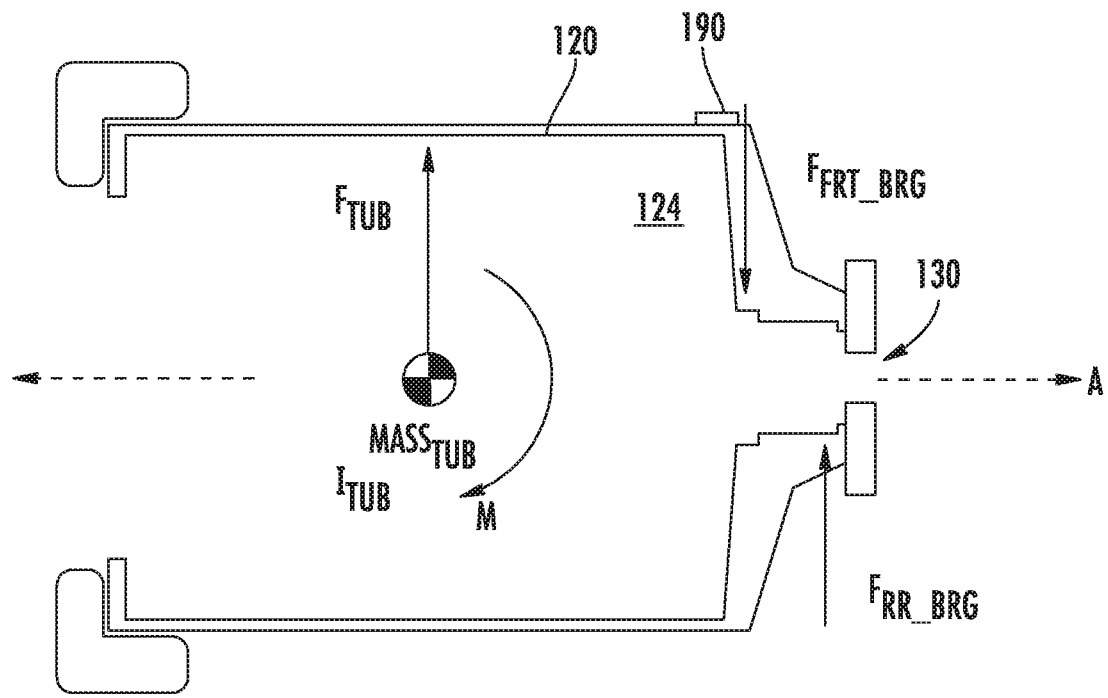
FIG. 5 provides a schematic side view of components of a washing machine appliance in accordance with exemplary embodiments of the present disclosure.
Figure 6:
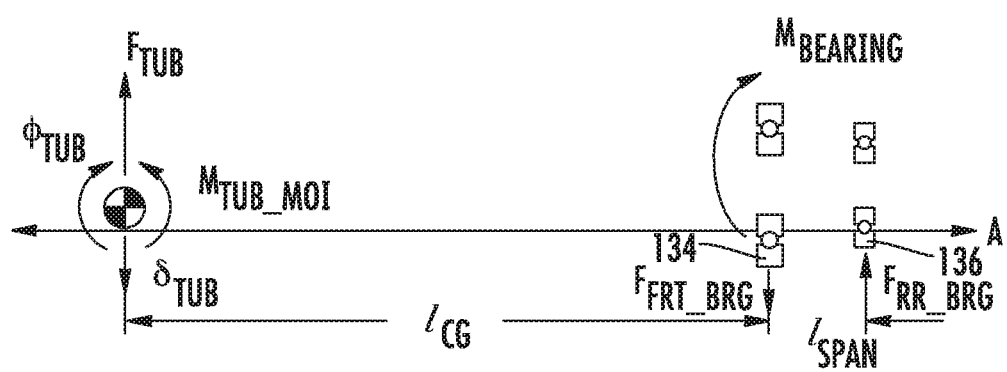
FIG. 6 provides a schematic representation of the forces acting on a wash tub of the exemplary washing machine appliance of FIG. 1 according to an exemplary embodiment of the present subject matter.

Referring now specifically to FIGS. 4 through 6, schematic representations of a washing machine appliance with the forces and moments acting on the washing machine appliance during operation are illustrated. Specifically, continuing the example from above, the forces and moments acting on wash tub 120, wash basket 122, front bearings 134, and rear bearings 136 are illustrated. In this regard, wash tub 120 and wash basket 122 are illustrated as and may be referred to herein as a "suspended mass" of a front load washing machine appliance 100 wherein wash tub 120 supports wash basket 122 by drive shaft 132 and bearings 134, 136. In general, the methods described herein are intended to limit the forces acting on bearings 134, 136 to prevent premature failure.

As shown in FIG. 4, out-of-balance force ($F_{OOB}$) acts on wash tub 120 proximate a front of wash tub 120 and has some amplitude. However, in practice, both the location and amplitude of the out-of-balance force are unknown. Some washing machine appliances use sensor systems to estimate the location and amplitude of the out-of-balance force ($F_{OOB}$) and make appropriate corrections. However, the present method may limit the basket speed in response to exceeding limit thresholds, and such thresholds may be determined absent accurate knowledge of the size or location of the unbalanced mass and thus the out-of-balance force ($F_{OOB}$).

For purposes of the present method, the suspended mass of washing machine appliance 100 is separated into parts convenient for the purpose of showing how the forces and moments at the shaft bearings 134, 136 have the same magnitude at equilibrium whether they are acting on the rotating mass (i.e., wash basket 122) from one side of the bearings or on the non-rotating mass (i.e., wash tub 120) from the other side. The spinning out-of-balance mass has a centrifugal force ($F_{OOB}$) that causes the acceleration of all other suspended masses, e.g., wash tub 120 and wash basket 122, to reach equilibrium with the out-of-balance force ($F_{OOB}$). Thus, the masses undergoing acceleration produce a collective force equal to and opposite of the out-of-balance force ($F_{OOB}$). FIG. 4 illustrates forces and moments acting on the basket 122. As shown, the out-of-balance force ($F_{OOB}$) is equal and opposite of the sum of the basket force ($F_{BSKT}$), the front bearing force ($F_{frt\_brg}$), and the rear bearing force ($F_{rr\_brg}$) at equilibrium. Also shown in FIG. 4 is a center of mass ($MASS_{BSKT}$) of the basket 122, about which a moment M acts.

While $F_{BSKT}$ and $F_{OOB}$ cannot be known, the mass of the tub 120 is fixed. For this reason, it is advantageous to use the mass properties of the tub to estimate the bearing forces. FIG. 5 illustrates the tub 120 with forces and moments acting thereon. For sake of clarity of illustration, the basket 122 and other components are omitted from FIG. 5 to more clearly depict the tub 120. As shown in FIG. 5, the forces, e.g., the front bearing force ($F_{frt\_brg}$), and the rear bearing force ($F_{rr\_brg}$) which are offset from the center of mass ($MASS_{Tub}$) of the tub 120, generate a moment M about the center of mass ($MASS_{Tub}$) of the tub 120.

Referring now specifically to FIG. 6, two fixed moment arms, $l_{CG}$ and $l_{SPAN}$, and two measurable motion displacement amplitudes, a linear displacement $\delta_{TUB}$ and an angular displacement amplitude $\phi_{TUB}$, are illustrated for the wash tub 120. For example, the angular displacement amplitude $\phi_{TUB}$ may be measured or determined using the gyroscope of measurement device 190 (e.g., via integration of detected rotational velocity data). The linear displacement $\delta_{TUB}$ and angle $\phi_{TUB}$ are signed, zero-to-peak amplitudes of the orbital motion of the tub 120 in a plane through the spin axis A of the rotating system where any spinning out-of-balance mass causes the combined tub and basket systems to orbit around the spin axis A. The spin axis A is offset from the shaft of the rotating systems and it is this offset that allows the inertial forces and moments to reach equilibrium with the centrifugal force of the out-of-balance mass. For example, the displacements $\delta_{TUB}$ and $\phi_{TUB}$ may be measured by a motion sensor 190 attached to the tub 120. The relative signs, e.g., positive or negative, of $\delta_{TUB}$ and $\phi_{TUB}$ are included in the process of taking the measurement. Also shown in FIG. 6 are moments $M_{TUB\_MOI}$ and $M_{BEARING}$. The moment $M_{TUB\_MOI}$ may be the moment reaction due to the moment of inertia (MOI), $I_{TUB}$ of the tub 120. The moment $M_{BEARING}$ is a reaction moment created by the torsional stiffness of the bearings and may be generally opposite $M_{TUB\_MOI}$, e.g., as illustrated in FIG. 6.

The displacements $\delta_{TUB}$ and $\phi_{TUB}$ may be referred to herein as "virtual point amplitudes" because they are remotely calculated by a sensor, e.g., with accelerometers, gyroscopes, or both. In this regard, virtual point amplitudes are intended to refer to displacement or motion calculated at a location that is remote from a measurement device 190. Virtual point amplitudes may generally be determined by estimation assuming wash tub 120 is a rigid body and knowing the dimensional configuration of wash tub 120. Notably, by using known dimensional parameters, the position or motion of any point, including points away from the place where the measurement device 190 is located, may be predicted based on the measured motion at the measured location. In this manner, washing machine appliance 100 need not include multiple measurement devices 190 while still maintaining the motion of each point on wash tub 120. It should be appreciated that the displacements $\delta_{TUB}$ and $\phi_{TUB}$ may be actual measured displacements or virtual point amplitudes according to various embodiments of the present subject matter. For example, a pair of accelerometers spaced apart from each other can accurately measure angular motion and replicate the function of the gyroscope. Also, a multi-axis accelerometer mounted on top of the tub 120 above the tub center of gravity may accurately measure radial motion, e.g., along the vertical direction V (FIG. 3), of the tub mass. Using the same location, angular motion may be inferred using the axial motion at the sensor, e.g., along the transverse direction T (FIG. 3), by knowing the distance of the sensor, e.g., measurement device 190, above the center of gravity.

The moment arms $l_{CG}$ and $l_{SPAN}$ are known values based on appliance geometry. The values of the displacement amplitudes $\delta_{TUB}$ and $\phi_{TUB}$ may be determined using measurement sensor 190 and the known geometry of washing machine appliance 100.

According to an exemplary embodiment, using the modeled forces and moments described above and as illustrated in FIGS. 4 through 6, a formulation of the forces acting on the bearings 134, 136 will be described below according to an exemplary embodiment. Specifically, the rear bearing force ($F_{rr\_brg}$) can be found from the summation of moments around front bearing 134 as a function of the basket speed ($\omega$) measured in radians per second, as set forth in the equilibrium equation below:

$$\Sigma M = 0 = \omega^2(-\delta_{TUB}\text{mass}_{TUB}\, l_{CG} + \varnothing_{TUB} I_{TUB}) + F_{RR\_BRG}\, l_{SPAN} + M_{BEARING}$$

In the above equation, $I_{TUB}$ is the moment of inertia of the tub. $M_{BEARING}$ is a reaction moment created by the conical stiffness of the bearings. The conical stiffness of the bearings may be expressed in Newton-millimeters per radian (N·mm/rad).

Moment $M_{BEARING}$ is proportional to and opposes the net moment applied to the bearings by the inertial forces and moments so that the contribution of $M_{BEARING}$ can be represented by multiplying the applied moments by $C_{BEARING\ MOMENT}$. For example, the constant $C_{BEARING\ MOMENT}$ may be less than one. Thus, the rear bearing force $F_{RR\_BRG}$ may be found by rearranging the equilibrium equation for moments and incorporating the experimentally-determined constant $C_{BEARING\ MOMENT}$ to represent the reaction moment of the bearings, resulting in the following equation:

$$F_{REAR\ BEARING} = \omega^2(\delta_{TUB}\text{mass}_{TUB}\, l_{CG} - \varnothing_{TUB} I_{TUB}) \cdot C_{BEARING\ MOMENT} \div l_{SPAN}$$

Accordingly, it may be possible to determine if the measured values $\delta_{TUB}$ and $\varnothing_{TUB}$ predict that either of the bearing forces is too large. To determine at some point in time if the rear bearing force is low enough to continue spinning at the current speed of the basket, the above equation may be used with current values of $\delta_{TUB}$ and $\phi_{TUB}$ to calculate a value that is compared to the maximum force allowed for the rear bearing 136, $F_{REAR\ LIMIT}$. For example, the current values of $\delta_{TUB}$ and $\phi_{TUB}$ may be measured by the measurement device 190. Such current values may be input into the following equation:

$$F_{REAR\ LIMIT} \geq |\omega^2(\delta_{TUB} mass_{TUB} \ell_{CG} - \varnothing_{TUB} I_{TUB}) C_{BEARING\ MOMENT} \pm l_{SPAN}|$$

which can be simplified as follows:

$$threshold_{REAR} = F_{REAR\ BEARING\ LIMIT} \geq |\omega^2(\delta_{TUB} C_{REAR\ 1} + \varnothing_{TUB} C_{REAR\ 2})|$$

where:

$$C_{REAR\ 1} = mass_{TUB} \ell_{CG} C_{BEARING\ MOMENT} / \ell_{SPAN} \text{ and}$$
$$C_{REAR\ 2} = -I_{TUB} C_{BEARING\ MOMENT} \ell_{SPAN}$$

Considering the front bearing 134, the force at the front bearing 134 may be found by the equilibrium equation for the forces acting on the tub mass, $\Sigma F$:

$$\Sigma F = 0 = \omega^2 \delta_{TUB} mass_{TUB} + F_{FRONT\ BEARING} + F_{REAR\ BEARING}$$

The above summation of forces equation may be rearranged to solve for the front bearing force $F_{FRONT\ BEARING}$. Then, substituting the above equation for $F_{REAR\ BEARING}$ into the rearranged summation of forces provides a test for the front bearing force $F_{FRONT\ BEARING}$:

$$F_{FRONT\ LIMIT} \geq |-\omega^2(\delta_{TUB} mass_{TUB} + (\delta_{TUB} mass_{TUB} \ell_{CG} - \varnothing_{TUB} I_{TUB}) C_{BEARING\ MOMENT} \pm \ell_{SPAN})|$$

where: $F_{FRONT\ LIMIT}$ is the maximum force allowed at the front bearing.

Rearranging and simplifying the above equation provides a simplified test for acceptable front bearing force:

$$threshold_{FRONT} = F_{FRONT\ LIMIT} \geq |\omega^2(\delta_{TUB} C_{FRONT\ 1} + \varnothing_{TUB} C_{FRONT\ 2})|$$

where:

$$C_{FRONT\ 1} = mass_{TUB}(1 + \ell_{CG} C_{BEARING\ MOMENT} / \ell_{SPAN}) \text{ and}$$

$$C_{FRONT\ 2} = -I_{TUB} C_{BEARING\ MOMENT} / \ell_{SPAN} = C_{REAR\ 2} = C_2$$

In some embodiments, the calculation may be further simplified by including the contribution of the rotational speed $\omega^2$ in the calculation of the constants, e.g., $C_{FRONT1}$, $C_{REAR1}$, and $C_2$, used for the equations above. For example, in such embodiments, the test for rear bearing force may include the following equation:

$$threshold_{REAR} = F_{REAR\ BEARING\ LIMIT} \geq |(\delta_{TUB} C_{REAR\ 1} + \varnothing_{TUB} C_{REAR\ 2})|$$

where:

$$C_{REAR\ 1} = \omega^2(mass_{TUB} \ell_{CG} C_{BEARING\ MOMENT} / \ell_{SPAN})$$
$$\text{and } C_{REAR\ 2} = \omega^2(-I_{TUB} C_{BEARING\ MOMENT} / \ell_{SPAN})$$

and the test for acceptable front bearing force may include:

$$threshold_{FRONT} = F_{FRONT\ LIMIT} \geq |(\delta_{TUB} C_{FRONT\ 1} + \varnothing_{TUB} C_{FRONT\ 2})|$$

where:

$$C_{FRONT\ 1} = \omega^2(mass_{TUB}(1 + \ell_{CG} C_{BEARING\ MOMENT} / \ell_{SPAN})) \text{ and}$$

$$C_{FRONT\ 2} = \omega^2(-I_{TUB} C_{BEARING\ MOMENT} / \ell_{SPAN}) = C_{REAR\ 2} = C_2$$

In some embodiments, the roles of the front bearing force and the rear bearing force described above may be reversed. For example, the front bearing force $F_{FRONT\ BEARING}$ can be determined first using the moment equilibrium equation followed by solving for the rear bearing force $F_{REAR\ BEARING}$ using the force equilibrium equation.

In some instances, one of the bearing forces may reach the threshold while the force on the other bearing is relatively small. Accordingly, both bearing forces may be evaluated. If either value is too large, at least one operating parameter of the washing machine appliance 100 may be adjusted, e.g., by the controller 186. For example, adjusting at least one operating parameter may include slowing the basket speed to reduce the forces generated at the bearing, e.g., from an out-of-balance mass. As used herein, an "operating parameter" of washing machine appliance 100 is any cycle setting, operating time, component setting, spin speed, part configuration, or other operating characteristic that may affect the performance of washing machine appliance 100. Thus, references to operating parameter adjustments or "adjusting at least one operating parameter" are intended to refer to control actions intended to improve system performance in response to out-of-balance masses, bearing forces, displacement amplitudes, etc. Basket spins speeds are used herein as exemplary adjusted operating parameters, but such use is not intended to limit the scope of operating parameter adjustments.

After adjusting the at least one operating parameter, e.g., speed, the test may be performed again at the lower speed using updated current values of $\omega$, $\delta_{TUB}$ and $\phi_{TUB}$. Testing may be performed at a steady speed or while accelerating or decelerating.

Now that the construction of washing machine appliance 100 and the configuration of controller 186 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 186 or a separate, dedicated controller.

Figure 7:
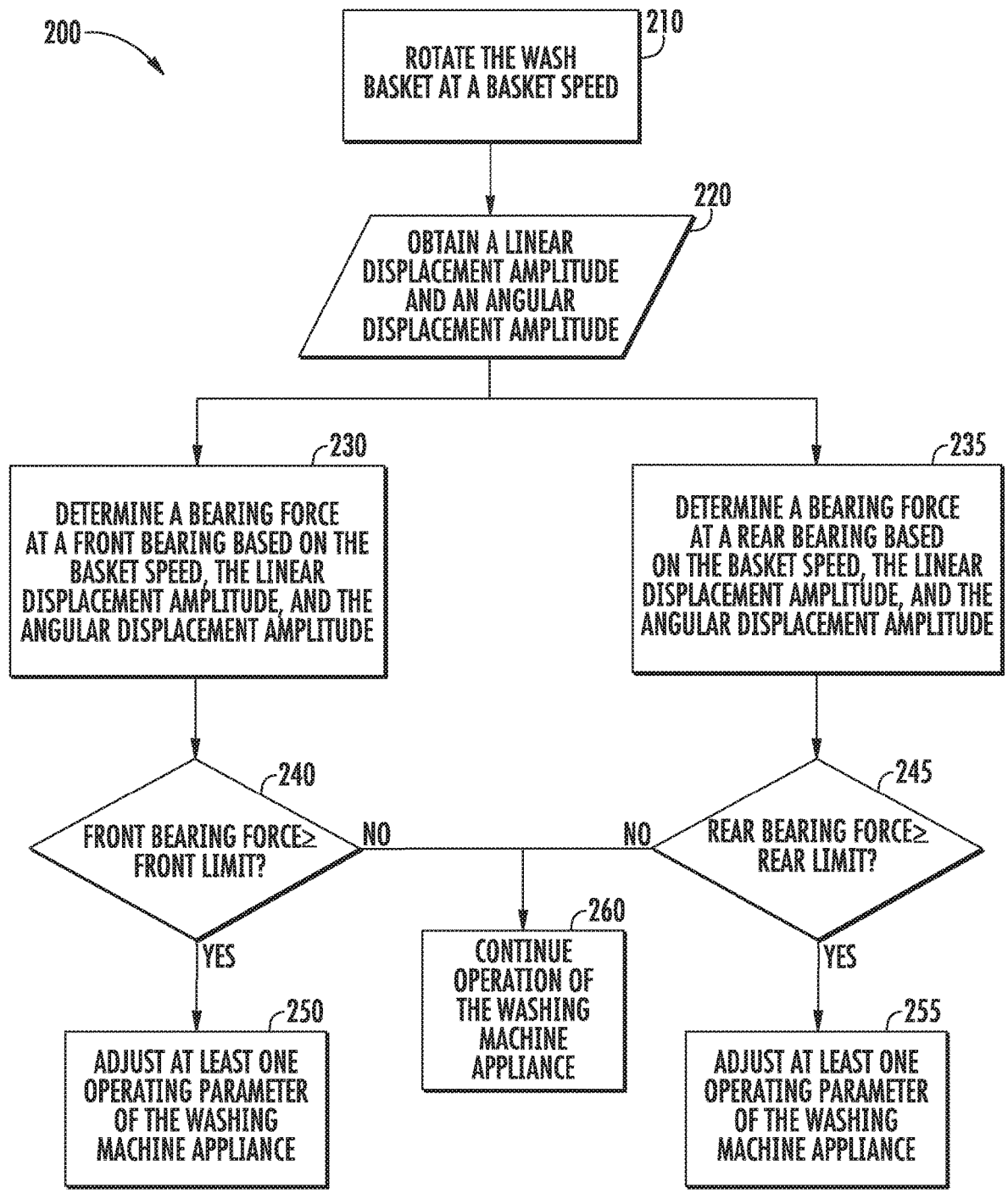
FIG. 7 illustrates a method for controlling a washing machine appliance in accordance with one embodiment of the present disclosure.

Referring now to FIG. 7, an exemplary method 200 is described for use with washing machine appliances in accordance with the present disclosure. In general, the various steps of methods as disclosed herein may, in exemplary embodiments, be performed by the controller 186, which may receive inputs from and transmit outputs to various other components of the appliance 100. In particular, the present disclosure is further directed to a method 200 for operating a washing machine appliance 100. Such methods advantageously facilitate monitoring of load balance states and wash tub displacements, determining when bearing forces have reached undesirable levels, and initiating corrective action to prevent excessive bearing forces. In exemplary embodiments, such balancing may be performed during the spin cycle, following one or more of a draining, wash cycle, rinse cycle, etc.

Turning especially to FIG. 7, at 210, the method 200 includes rotating a wash basket within a wash tub at a basket speed. Continuing the example from above, wash basket 122 may be rotated by drive assembly 128 or motor assembly 130. In addition, the basket speed may be measured by motor assembly 130, e.g., by monitoring the back electromotive force (EMF) of the motor, or in any other suitable manner. The basket speed may be any suitable speed for plastering articles within the wash basket onto the wash basket or otherwise generating an out-of-balance (OOB) force.

In some embodiments, step 210 follows a wash cycle or rinse cycle and may, furthermore, follow a draining a volume of liquid from the tub. For instance, step 210 may occur after flowing a volume of liquid into the tub. The liquid may include water, and may further include one or more additives as discussed above. The water may be flowed through hoses, a tube, and nozzle assembly into the tub and onto articles that are disposed in the basket for washing. The volume of liquid may be dependent upon the size of the load of articles and other variables which may, for example, be input by a user interacting with the control panel and input selectors thereof.

Optionally, step 210 may occur after agitating articles within the tub (e.g., for an agitation period). During such agitation (which may be a sub-phase of the wash cycle), the volume of liquid flowed into the tub in may remain in the tub (i.e., before the volume of liquid is drained from tub). Moreover, during the agitation period, the basket may be rotated (e.g., at the tumble speed) or oscillated in alternating clockwise-counterclockwise rotation. The agitation period may be defined period of time programmed into the controller. The rotational or oscillation speed, pattern of agitation, and the agitation period may be dependent upon the size of the load of articles.

Method 200 further includes, at step 220, obtaining a first displacement amplitude of the wash tub and a second displacement amplitude using a measurement device. For example, the first and second displacement amplitudes may include a linear displacement $\delta_{TUB}$ and an angular displacement amplitude $\phi_{TUB}$, as described above. According to exemplary embodiments, the first and second displacement amplitudes may be determined by a measurement device including an accelerometer and a gyroscope. In such an embodiment, for example, the measurement device may be mounted at a convenient location on the outside of wash tub 120 and may be used for determining the displacement of any location on the rigid body of the tub, as described herein.

Step 230 includes determining a bearing force at the front bearing based on the basket speed and the first and second displacement amplitudes, e.g., the linear displacement $\delta_{TUB}$ and the angular displacement amplitude $\phi_{TUB}$. Step 235 includes determining a bearing force at the rear bearing based on the basket speed and the first and second displacement amplitudes. For example, the bearing force at the front bearing may be determined using the following equation, where the basket speed is represented by $\omega$ and the at least one displacement may be one or both of the linear displacement $\delta_{TUB}$ and the angular displacement amplitude $\phi_{TUB}$.

$$F_{FRONT\ BEARING} = -\omega^2 \delta_{TUB} mass_{TUB} - F_{REAR\ BEARING}$$

The above equation for front beating force may also be expressed as:

$$F_{FRONT\ BEARING} = \omega^2(\delta_{TUB} C_{FRONT\ 1} + \varnothing_{TUB} C_{FRONT\ 2})$$

Also by way of example, the bearing force at the rear bearing may be determined using the following equation:

$$F_{REAR\ BEARING} = \omega^2(\delta_{TUB} mass_{TUB} \ell_{CG} - \varnothing_{TUB} I_{TUB})$$

$$C_{BEARING\ MOMENT} \doteq \ell_{SPAN}$$

The above equation for rear bearing force may also be expressed as:

$$F_{REAR\ BEARING} = \omega^2(\delta_{TUB} C_{REAR\ 1} + \varnothing_{TUB} C_{REAR\ 2})$$

or, in embodiments where the constants also include the speed, $\omega^2$, the equations for front bearing force and rear bearing force may be:

$$F_{FRONT\ BEARING} = (\delta_{TUB} C_{FRONT\ 1} + \varnothing_{TUB} C_{FRONT\ 2})$$

and $$F_{REAR\ BEARING} = (\delta_{TUB} C_{REAR\ 1} + \varnothing_{TUB} C_{REAR\ 2})$$

respectively.

Step 240 includes comparing the bearing force at the front bearing to a front limit and determining whether the front bearing force is greater than or equal to a front limit. Step 245 includes comparing the bearing force at the rear bearing to a rear limit and determining whether the rear bearing force is greater than or equal to a rear limit. Notably, the bearing force limits may be known, e.g., the force limit in pounds may be set by the bearing manufacturer. Similarly, the system constants needed for determining the bearing force amplitude thresholds may include known values dependent on system configuration and geometry, e.g., the lengths of the moment arms described above.

If either of the conditions is satisfied at step 240 or step 245, method 200 may proceed to step 250 or 255. In such cases, either of step 250 or step 255 includes adjusting at least one operating parameter of the washing machine appliance. Thus, method 200 may include adjusting at least one operating parameter of the washing machine appliance at step 250 or step 255 when the bearing force at the front bearing is greater than or equal to the front limit at step 240 or when the bearing force at the rear bearing is greater than or equal to the rear limit at step 245. If either one of the bearing forces equals or exceeds the respective limit, the method 200 may adjust the at least one operating parameter at steps 250 and/or 255. For example, step 250 or step 255 may include slowing the basket speed to reduce the forces generated at the bearing from an out-of-balance mass.

When both determinations at step 240 and step 245 are "NO," e.g., when both of the bearing forces are less than the respective limit, the method 200 may proceed to a step 260 of continuing operation of the washing machine appliance 100. The step 260 may include continuing normal operation of the washing machine appliance 100, with no further action taken with respect to presently disclosed methods. The continuation of normal operation in accordance with the present disclosure is generally continuance of operation of the washing machine appliance 100 in accordance with the present settings, with no adjustments in accordance with the present method. For example, the step 260 of continuing operation may include performing and/or completing a user-selected cycle according to a predetermined routine, such as continuing a spin cycle for a set amount of time.

FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that these methods may be applied to the operation of any suitable washing machine appliance.

The present disclosure may provide several advantages. For example, bearing forces may be more accurately predicted, in particular when using hot water in the washing machine appliance 100, where "hot" water is understood to include temperatures which are within the high end of the range of water temperatures for washing machine appliance operation and are sufficiently high to induce softening of the material supporting the bearing loads caused by warming the material. As another example, including moments in the calculations used to determine the bearing forces may more accurately predict the effect of an out-of-balance load as compared to methods which consider only linear forces, especially when the unknown out-of-balance load causes large angular and linear displacement amplitudes while the wash basket is rotating at high speeds. For yet another example, the accuracy of methods according to the present disclosure is not affected by the size of the evenly distributed wash load mass. Another example is that a reduced stiffness of the structure between the tub and basket masses resulting from elevated temperature does not affect the accuracy of the predicted bearing forces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a washing machine appliance, the washing machine appliance having a wash tub, a wash basket rotatably mounted within the wash tub by a drive shaft, and a front bearing and a rear bearing for supporting the drive shaft, the method comprising:
    rotating the wash basket within the wash tub at a basket speed;
    measuring a first displacement amplitude of the wash tub with a measurement device comprising an accelerometer and a gyroscope;
    measuring a second displacement amplitude of the wash tub with the measurement device;
    determining a bearing force at the front bearing based on the basket speed, the first displacement amplitude, and the second displacement amplitude;
    determining a bearing force at the rear bearing based on the basket speed, the first displacement amplitude, and the second displacement amplitude;
    comparing the bearing force at the front bearing to a predetermined front limit;
    comparing the bearing force at the rear bearing to a predetermined rear limit; and
    decreasing the basket speed of the wash basket when the bearing force at the front bearing is greater than or equal to the front limit or the bearing force at the rear bearing is greater than or equal to the rear limit.

2. The method of claim 1, wherein the step of measuring the first displacement amplitude comprises measuring a linear displacement amplitude and the step of measuring the second displacement amplitude comprises measuring an angular displacement amplitude.

3. The method of claim 1, wherein one of the first displacement amplitude and the second displacement amplitude is an angular displacement amplitude and the bearing force at the rear bearing is determined based on the moment of inertia of the tub and the angular displacement amplitude.

4. The method of claim 1, wherein one of the first displacement amplitude and the second displacement amplitude is an angular displacement amplitude and the bearing force at the front bearing is determined based on the moment of inertia of the tub and the angular displacement amplitude.

5. The method of claim 1, wherein the bearing force at the rear bearing is determined based on a moment about the front bearing.

6. The method of claim 5, wherein one of the first displacement amplitude and the second displacement amplitude is a linear displacement amplitude and the moment about the front bearing is calculated based on the linear displacement amplitude, the mass of the wash tub, and a moment arm extending from the front bearing to the center of mass of the tub.

7. The method of claim 1, wherein the bearing force at the front bearing is determined based on a moment about the front bearing.

8. The method of claim 7, wherein one of the first displacement amplitude and the second displacement amplitude is a linear displacement amplitude and the moment about the front bearing is calculated based on the linear displacement amplitude, the mass of the wash tub, and a moment arm extending from the front bearing to the center of mass of the tub.

9. A washing machine appliance comprising:
    a cabinet;
    a wash tub positioned within the cabinet;
    a measurement device operably coupled to the wash tub, the measurement device comprising an accelerometer and a gyroscope;
    a wash basket rotatably mounted within the wash tub by a drive shaft supported by a front bearing and a rear bearing;
    a drive assembly in mechanical communication with the wash basket for rotating the wash basket; and
    a controller communicatively coupled to the drive assembly and the measurement device, the controller configured for:
        rotating the wash basket within the wash tub at a basket speed;
        obtaining a first displacement amplitude of the wash tub from the measurement device;
        obtaining a second displacement amplitude of the wash tub from the measurement device;
        determining a bearing force at the front bearing based on the basket speed, the first displacement amplitude, and the second displacement amplitude;
        determining a bearing force at the rear bearing based on the basket speed, the first displacement amplitude, and the second displacement amplitude;
        comparing the bearing force at the front bearing to a predetermined front limit;
        comparing the bearing force at the rear bearing to a predetermined rear limit; and
        decreasing the basket speed of the wash basket when the bearing force at the front bearing is greater than or equal to the front limit or the bearing force at the rear bearing is greater than or equal to the rear limit.

10. The washing machine appliance of claim 9, wherein the first displacement amplitude is a linear displacement amplitude and the second displacement amplitude is an angular displacement amplitude.

11. The washing machine appliance of claim 9, wherein one of the first displacement amplitude and the second displacement amplitude is an angular displacement amplitude and the bearing force at the rear bearing is determined based on the moment of inertia of the tub and the angular displacement amplitude.

12. The washing machine appliance of claim 9, wherein one of the first displacement amplitude and the second displacement amplitude is an angular displacement amplitude and the bearing force at the front bearing is determined based on the moment of inertia of the tub and the angular displacement amplitude.

13. The washing machine appliance of claim 9, wherein the bearing force at the rear bearing is determined based on a moment about the front bearing.

14. The washing machine appliance of claim 13, wherein one of the first displacement amplitude and the second displacement amplitude is a linear displacement amplitude and the moment about the front bearing is calculated based on the linear displacement amplitude, the mass of the wash tub, and a moment arm extending from the front bearing to the center of mass of the tub.

15. The washing machine appliance of claim 9, wherein the bearing force at the front bearing is determined based on a moment about the front bearing.

16. The washing machine appliance of claim 15, wherein one of the first displacement amplitude and the second displacement amplitude is a linear displacement amplitude and the moment about the front bearing is calculated based on the linear displacement amplitude, the mass of the wash tub, and a moment arm extending from the front bearing to the center of mass of the tub.

* * * * *